United States Patent
Murching et al.

(10) Patent No.: US 6,381,363 B1
(45) Date of Patent: Apr. 30, 2002

(54) HISTOGRAM-BASED SEGMENTATION OF IMAGES AND VIDEO VIA COLOR MOMENTS

(75) Inventors: Anil M. Murching; Ali Tabatabai; Thumpudi Naveen, all of Beaverton, OR (US)

(73) Assignee: Grass Valley (U.S.), Inc., Nevada City, CA (US)

(*) Notice: Subject to any disclaimer, the term of this patent is extended or adjusted under 35 U.S.C. 154(b) by 0 days.

(21) Appl. No.: 09/326,164

(22) Filed: Jun. 4, 1999

Related U.S. Application Data

(63) Continuation-in-part of application No. 09/270,233, filed on Mar. 15, 1999.

(51) Int. Cl.[7] ................................................ G06K 9/00
(52) U.S. Cl. ......................... 382/164; 382/168; 382/173
(58) Field of Search ................................. 382/162–167, 382/173–180, 168–172; 358/504–537

(56) References Cited

U.S. PATENT DOCUMENTS

| | | | | |
|---|---|---|---|---|
| 5,933,524 A | * | 8/1999 | Schuster et al. ............ | 382/168 |
| 6,035,059 A | * | 3/2000 | Kurosawa et al. ........... | 382/164 |
| 6,167,167 A | * | 12/2000 | Matsugu et al. ............. | 382/283 |
| 6,246,803 B1 | * | 6/2001 | Gauch ......................... | 382/276 |

* cited by examiner

Primary Examiner—Amelia M. Au
Assistant Examiner—Jingge Wu
(74) Attorney, Agent, or Firm—Smith-Hill and Bedell

(57) ABSTRACT

A histogram-based segmentation of images in a video signal via color moments is initialized by a user defining regions in objects of interest from one or more images, key frames or pictures of the video signal. For each rectangle a normalized average color moment and associated co-variance matrix are determined which define a color class for that rectangle. From the normalized average color moment and associated co-variance garbage parameters are generated. Segmentation is then performed on a block basis on each image of the video sequence, a normalized color moment being generated for each block. Using a log likelihood test the closest color class for the block is determined. Based upon the closest color class and the garbage parameters for that color class a final determination is made in a two stage test as to whether the block belongs to the closest class or to a "garbage" class. All the contiguous blocks that belong to a specific color class form the segmented object, and all of the objects are segmented in this manner.

2 Claims, 2 Drawing Sheets

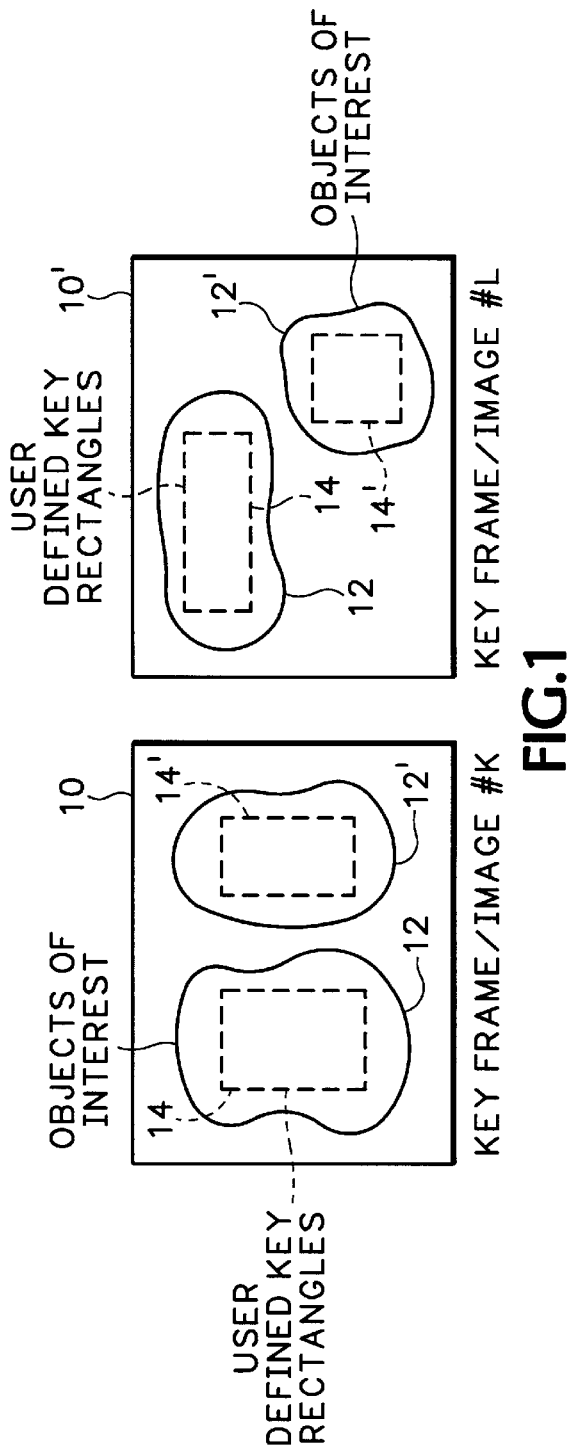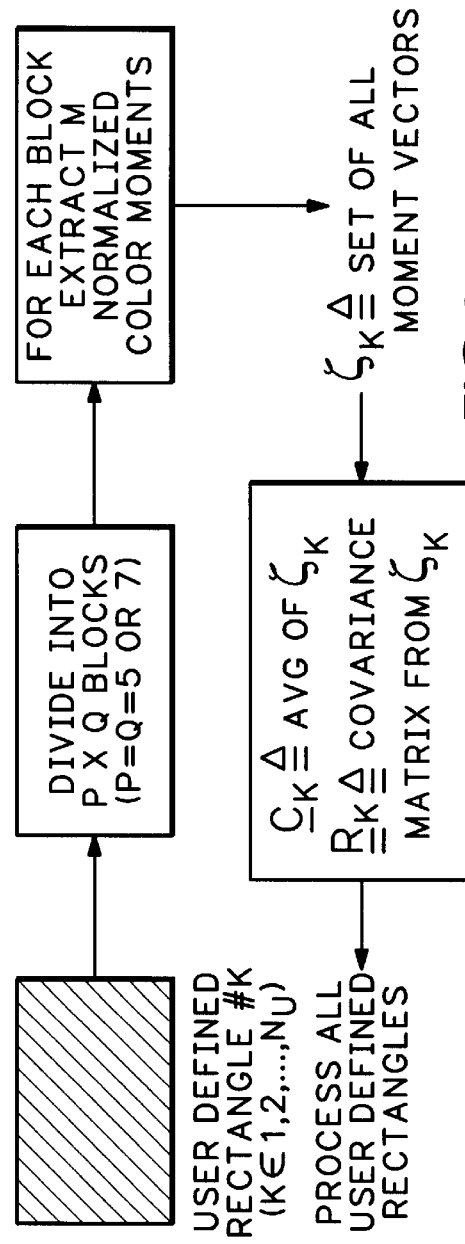

HISTOGRAM-BASED SEGMENTATION OF IMAGES AND VIDEO VIA COLOR MOMENTS

CROSS-REFERENCE TO RELATED APPLICATIONS

This is a continuation-in-part of U.S. patent application Ser. No. 09/270,233 filed Mar. 15, 1999 by the same inventors entitled "Histogram-Based Segmentation of Objects from a Video Signal via Color Moments".

BACKGROUND OF THE INVENTION

The present invention relates to processing of video signals, and more particularly to a histogram-based segmentation of images and video via color moments.

In the processing of images or video signals it is desirable to be able to take an object, such as a tennis player, from one video signal or image and superimpose it upon another video signal or image. To this end keying systems were developed—either luminance or chrominance based. For example, in character generation luminance keying is typically used, while chrominance keying is used for placing a weather man in front of a weather map. Chrominance keying is based upon the object to be segmented, i.e., the weather man, being situated before a uniform color background, such as a blue screen. A key signal is generated that is one value when the color is blue and another value when the color is not blue. The key signal is then used to cut a hole in another video signal into which the segmented object is placed, thus superimposing an object from one video signal onto another.

In naturally occurring scenes there may be many objects against a non-uniform color background, such as tennis players and the ball against a crowd background. It may be desirable to segment an object from this scene in order to superimpose it upon another scene. In this situation conventional luminance and chrominance key generation techniques do not work.

Also in the proposed MPEG-7 standard it is desirable to be able to segment objects from an image so that objects may be separately compressed.

What is desired is a method of segmenting images and video using the colors of the objects within the images.

BRIEF SUMMARY OF THE INVENTION

Accordingly the present invention provides histogram-based segmentation of images and video via color moments. A user defines a relatively large area that lies entirely within each object of interest in one or more images, frames or pictures from a video signal. A normalized, average color moment vector is generated with an associated co-variance matrix for each user-defined area, as well as "garbage" parameters based upon the normalized average color moment and associated co-variance matrix. Each normalized average color moment vector defines a color class. A segmentation algorithm then examines each block of each image, frame or picture, deriving a color moment vector for each block. A log likelihood test is used to determine for each block of the image, frame or picture which color class does the block most likely fall into. Then a pair of "garbage" model tests based on the "garbage" parameters are conducted to assure that the block is within the most likely color class. If the block fails one of the "garbage" model tests, then the block is classified as being a member of a "garbage" color class. All connected blocks that fall within a given color class are determined about the centroid of the corresponding user-defined rectangle and are associated with the corresponding object for which a segmentation key is generated for the object. The centroid is tracked from frame to frame of the video using a variation of a Kalman filter.

The objects, advantages and other novel features of the present invention are apparent from the following detailed description when read in conjunction with the appended claims and attached drawing.

DESCRIPTION OF THE SEVERAL VIEWS OF THE DRAWING

FIG. 1 is an illustrative display view of images or key frames from a video signal containing multiple objects to be segmented according to the present invention.

FIG. 2 is an illustrative flow diagram view of the processing for determining for each object a normalized average color moment vector with associated co-variance that defines a color class for the object according to the present invention.

DETAILED DESCRIPTION OF THE INVENTION

Figure 3:
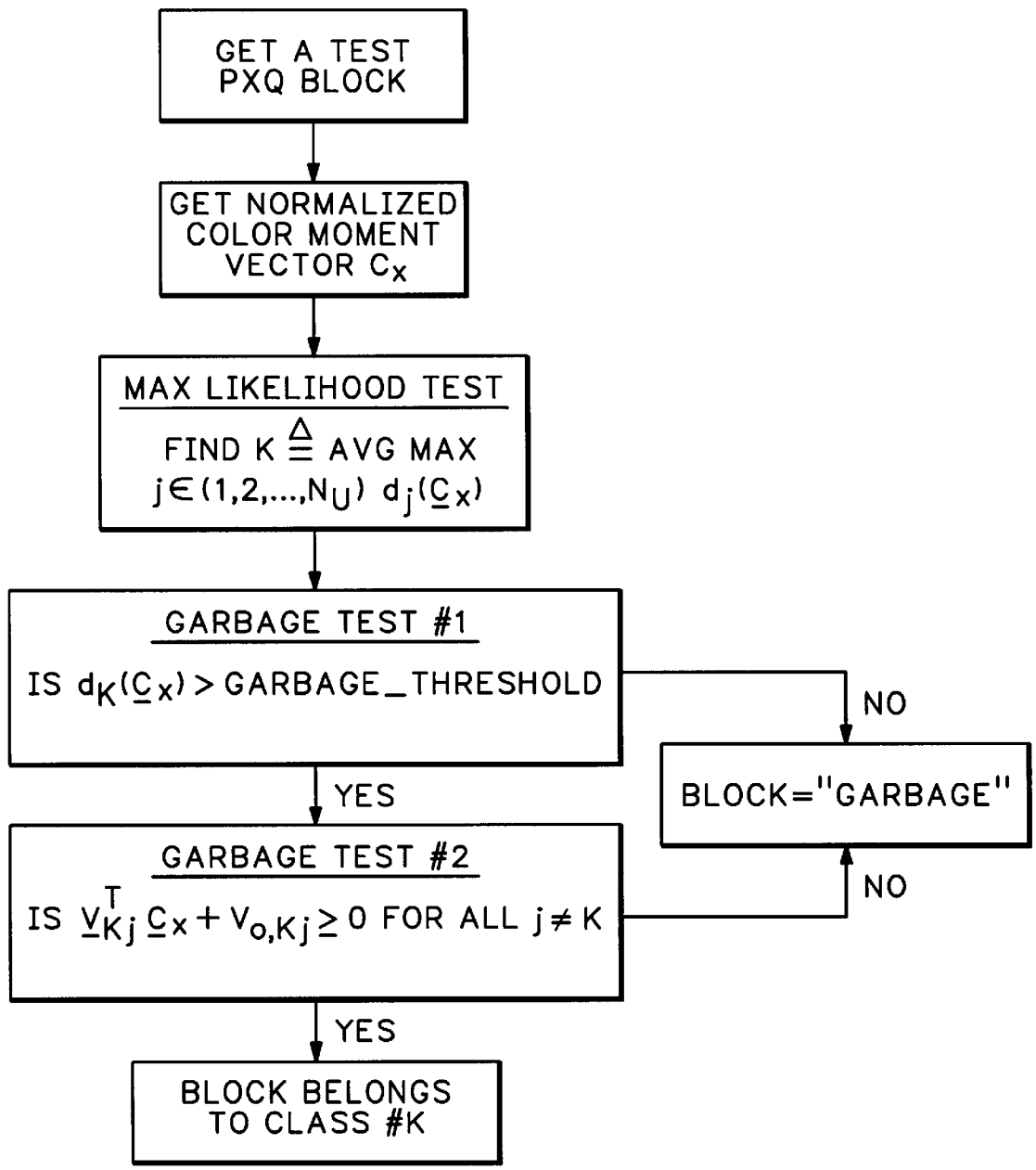
FIG. 3 is a flow chart view of the segmentation algorithm for each block of an image or key frame in the video signal to determine into which color class the block falls according to the present invention.

The basic concept of the present invention is to perform semiautomatic extraction of an object or objects of interest from a given color sequence of images, frames or pictures of a video signal using color moments that represent a color histogram for the object(s). Referring now to FIG. 1 a pair of color images or key frames 10, 10' from the given color sequence is shown with the object(s) of interest 12, 12'. For each object of interest 12, 12' in each key frame 10, 10' a user is asked to define a relatively large area 14, 14', such as a rectangle, that lies entirely within the object of interest. In a video clip different objects may appear in different frames, so the user is allowed to use as many frames as needed to define objects that are of interest. Typically the user uses frames where the objects of interest are clearly visible. A segmentation algorithm begins by characterizing the color information within each user-defined area 14, 14'. The use of color histograms for this purpose is a well-known technique. However such methods are subject to certain limitations: namely the color space has to be divided into a finite number of "bins", and selecting a good set of such bins is image-dependent and, therefore, less robust.

The use of color moments to represent a color histogram circumvents the problems presented by using color histogram methods by eliminating the need for explicit quantization of the color histogram into a number of bins. In the field of probability/statistics it is known that a histogram is uniquely specified by all its moments. The relationship is:

$$\Phi_{X1X2X3}(w_1, w_2, w_3) = FT\{h_{X1X2X3}(x_1, x_2, x_3)\} = \sum_{k,l,m=0}^{\infty} E\{X_1^k X_2^l X_3^m\}((jw_1)^k/k!) * ((jw_2)^l/l!) * ((jw_3)^m/m!)$$

where X1, X2, X3 represent the three color components, $h_{X1X2X3}(.)$ is the three-dimensional histogram, $\Phi_{X1X2X3}(.)$ is the Fourier transform of the histogram (characteristic function), and $E\{X_1^k X_2^l X_3^m\}$ represents the moments.

Each pixel in the object 12 has three color components. For the present illustration the $Y, C_b, C_r$ domain is used. To characterize the histogram of the object, instead of an infinite set of moments as in the above equation, a finite number of color moments is used. For the present example 13 normalized color moments are used:

| | | |
|---|---|---|
| $E\{Y\}$ | $E\{C_b\}$ | $E\{C_r\}$ |
| $\sqrt{(E\{Y^2\})}$ | $\sqrt{(E\{Cb^2\})}$ | $\sqrt{(E\{Cr^2\})}$ |
| $\sqrt[3]{(E\{Y^3\})}$ | $\sqrt[3]{(E\{Cb^3\})}$ | $\sqrt[3]{(E\{Cr^3\})}$ |
| $128*P_{YCb}$ | $128*P_{YCr}$ | $128*P_{CrCb}$ |
| | $\sqrt[3]{(E\{YCbCr\})}$ | | where $P_x$ is a correlation coefficient, i.e., $$P_{YCb} \Delta (E\{YCb\} - E\{Y\} E\{Cb\})/(\sigma_Y \sigma_{Cb})$$

where σ are the variances.

From the large user-defined areas 14, 14' the above moments for those areas may be calculated to provide 13-point normalized average color moment vectors $\{C^*\}$ that characterize each area where $C^* = [E\{Y\}, E\{C_b\}, \ldots]^T$. For each of $N_U$ user defined rectangles corresponding to an equal number of objects of interest, the average of the M color moments is computed from PxQ blocks (P=Q=5, for example). The algorithm may use smaller values of P and Q, and in such cases some of the moments are redundant. This gives a set of $N_U$ color moment vectors that characterize the objects of interest by their color information.

In order to segment a given image from the sequence of images into $N_U$ "color" classes, the well-known log likelihood test is used. The method is:

Segmentation Algorithm (1) Divide the image into non-overlapping PxQ blocks.

(2) For each block compute the normalized color moment vector using the above equations. Let the resultant M-point color vector be $C_x$. Then the block belongs to the "color" class #k iff:

$$k = \arg \max \{-\tfrac{1}{2}(C_x - C_j)^T R_j^{-1}(C_x - C_j) - \tfrac{1}{2} \ln |R_j|\} (j=1, 2, \ldots N_u)$$

where $R_j$ is a covariance matrix for class #j.

To compute $R_j$ divide the user defined rectangle that characterizes the color class #j into PxQ blocks, get the normalized color moment vectors for all these blocks, and then use the definition of the covariance matrix:

$$R_j \Delta E\{C_x C_x^T\} - E\{C_x\}(E\{C_x\})^T$$

The above segmentation algorithm classifies each PxQ block of the image into one among the $N_u$ color classes. Not all colors in a given video image sequence are captured among the $N_u$ classes defined by the user. Therefore an extra class is needed, denoted as a "garbage" class, into which all PxQ blocks that are not "close enough" to one of the $N_u$ classes are classified.

Garbage Models:

Model I:

Let $\zeta_k$ be the set of all normalized color moment vectors of PxQ blocks in user defined rectangle #k, and determine a distance measure:

$$d_k(C_x) \Delta -\tfrac{1}{2}(C_x - C_k)^T R_k^{-1}\{C_x - C_k) - \tfrac{1}{2} \ln |R_k|\}$$

The garbage model parameters are estimated from the user defined rectangles as follow:

A. When the user draws a particular rectangle, it is an indication that all blocks within that rectangle must be "accepted" as belonging to that class. Therefore the "tolerance" level for that class must be as high as that of the worst likelihood among the blocks within that user defined rectangle:

$$d_{INTRA,k} = \min_{(C_x \in \zeta_k)} d_k(C_x)$$

B. When the user draws different rectangles designating them as different classes, the user is indicating that the segmentation algorithm should be able to discriminate between any pair of blocks belonging to two different rectangles. For a given class #k, the highest likelihood of any block in all the other classes/rectangles gives an idea as to how high the "rejection threshold" should be for class #k:

$$d_{INTER,k} = \max_{(j \in \{1,2,\ldots N_u\})} \max_{(C_x \in \zeta_j)} d_k(C_x)$$

Using A and B:

$$d_{min,k} = \min \{d_{INTRA,k}, d_{INTER,k}\}$$

$$GARBAGE\_THRESHOLD_k = 1.25 * d_{min,k} \quad \text{if } d_{min,k} < 0$$

$$= 0.75 * d_{min,k} \quad \text{if } d_{min,k} \geq 0$$

For each class #k the value of $GARBAGE\_THRESHOLD_k$ tells how high the likelihood $d_k(C_x)$ of any test block $C_x$ should be in order to consider that block as belonging to class #k. Any block with a likelihood value below $GARBAGE\_THRESHOLD_k$ should not be accepted as belonging to class #k.

The use of the above Garbage Model I is where a user selects only two rectangles, one red and one green for example. Then if the candidate block is blue in color, the max likelihood test may pick either one, say "green", as the one "closest" to blue. A quick comparison to the garbage thresholds tells the algorithm that, although the "blue" block is "most likely" to be in the "green" class, this likelihood is so poor that it should not be allowed to be classified as "green". At this point the algorithm correctly classifies this blue block as belonging to the "garbage" class. Model II:

The Garbage Model I has trouble distinguishing colors that are "close" to each other, i.e., between different shades of green. The following is an improvement on the Garbage Model I.

The idea is to perform a pairwise linear discrimination between classes. (See K. Fukunago "Introduction to Statistical Pattern Recognition", pps. 99, 100, 104, 115) For any pair of classes #k and #j, where k≠j:

$$V_{kj} \Delta (\tfrac{1}{2}(R_k + R_j))^{-1}(C_k - C_j)$$

Also $$V_{o,kj} \Delta \{-(V_{kj}^T R_k V_{kj})V_{kj}^T C_j - (V_{kj}^T R_j V_{kj})\} / \{V_{kj}^T R_k V_{kj} + V_{kj}^T R_j V_{kj}\}$$

If a given PxQ block with normalized color moment $C_x$ is classified as belonging to class #k, and it also satisfies the Garbage Model I test:

$$d_k(C_x) > GARBAGE\_THRESHOLD_k$$

then check if $$V_{kj}^T C_x + V_{o,kj} \geq 0 \text{ for all } j \neq k$$

Only then is this block accepted as belonging to class #k. Otherwise this block is a "garbage" block.

In summary the first step in an initialization (learning process) is shown in FIG. 2 where a key user-defined rectangle for color class #k is defined and then divided into PxQ non-overlapping rectangles. For each block M normalized color moments are extracted to form a color vector for each block. The set of color vectors is averaged and a covariance matrix is determined.

The second step in the learning process is the garbage model step, where $d_{INTRA,k}$, $d_{INTER,k}$, GARBAGE_THRESHOLD$_k$, $V_{kj}$ and $V_{o,kj}$ are determined as indicated above. Then the third step is the actual segmentation/classification as shown in FIG. 3. For each block in the image obtain a normalized color moment vector and conduct a maximum likelihood test with the color classses. Then conduct the Garbage Model I test, followed if successful by the Garbage Model II test. The result is a determination that the block either belongs to class #k or is "garbage."

From this collection of blocks a connected region is grown centered at the center of the user-defined area for that color class via morphological operations. The result is the segmentation of the object of interest 12 from the image 10 with a coarse boundary due to the size of the PxQ blocks. Correlating to a key signal for that color class, all of the values within the blocks of that color class would have one value, and all other blocks would have another value. Each block is classified independent of other blocks.

Thus the present invention provides a histogram-based segmentation of images and video via color moments by having a user define a plurality of rectangles, each within a particular object of interest, at one or more key frames; determine an average color moment vector and covariance for each rectangle; determine certain "garbage" constants; and then segment the images and video using color moments on each block within the image and applying a maximum likelihood test to the block, and then refining the result by a pair of "garbage" tests to determine whether the block belongs to a particular color group or is "garbage".

What is claimed is:

1. A method of histogram-based segmentation of images in a video signal via color moments comprising the steps of:

defining a plurality of rectangles within objects of interest in the images of the video signal, each rectangle representing a color class;

for each rectangle obtaining an average color moment vector and related covariance matrix;

determining from the average color moment vectors and related covariance matrices a set of garbage parameters for each color class;

for each block within the images of the video signal obtaining a normalized color moment vector;

comparing the normalized color moment vector with the average color moment vector for each block to determine a maximum likelihood of membership in one of the color classes; and applying the garbage parameters to determine whether the block is a member of one of the color classes based on the maximum likelihood of membership or is "garbage", those contiguous members of a color class defining a segmented object of interest.

2. The method according to claim 1 wherein the applying step comprises the steps of:

generating from the garbage parameters a garbage threshold; and comparing the maximum likelihood with the garbage threshold to relegate the block to "garbage" if the maximum likelihood is less than the garbage threshold.

* * * * *